United States Patent [19]

Rasiah

[11] Patent Number: 5,167,208
[45] Date of Patent: Dec. 1, 1992

[54] INTERNAL COMBUSTION ENGINE

[76] Inventor: Randolph R. Rasiah, 1291 10th St. NW. #102, New Brighton, Minn. 55112

[21] Appl. No.: 848,075

[22] Filed: Mar. 9, 1992

[51] Int. Cl.5 ............................................. F02B 75/32
[52] U.S. Cl. .............................. 123/197.4; 123/196 R; 123/74 AE; 123/71 R
[58] Field of Search .......... 123/74 AE, 197.4, 196 R, 123/71 R, 62

[56] References Cited

U.S. PATENT DOCUMENTS

| | | | |
|---|---|---|---|
| 976,858 | 11/1910 | Easthope, Jr. | 123/74 AE |
| 2,250,492 | 7/1941 | Miller | 123/197.4 |
| 2,465,116 | 3/1949 | Petersen | 123/74 AE |
| 3,053,342 | 9/1962 | Mansoff | 123/74 AE |
| 4,211,190 | 7/1980 | Indech | 123/197.4 |
| 4,724,800 | 2/1988 | Wood | 123/197.4 |
| 4,936,269 | 6/1990 | Beaty | 123/74 AE |

Primary Examiner—E. Rollins Cross
Assistant Examiner—Erick Solis
Attorney, Agent, or Firm—Leon Gilden

[57] ABSTRACT

An internal combustion engine is arranged with an elongate piston rod, with the piston fixedly mounted substantially medially of the rod, with an upper distal end of the rod including an oil reservoir chamber piston reciprocatably mounted within the oil reservoir chamber. The piston defines a combustion chamber between the piston and a crank case member rotatably mounting a crank shaft, with the piston rod rotatably mounted to the crank shaft at a lower distal end of the piston. Oil flow is directed through an oil delivery conduit into the oil reservoir chamber and through a conduit within the piston rod to enhance cooling of the piston maintaining its longevity during use.

6 Claims, 2 Drawing Sheets

INTERNAL COMBUSTION ENGINE

BACKGROUND OF THE INVENTION

1. Field of the Invention

The field of invention relates to internal combustion engines, and more particularly pertains to a new and improved internal combustion engine wherein the same is arranged to effectively effect pulling of a piston rod during a combustion stroke and the cooling of the piston rod by oil delivery conduit directed therethrough.

2. Description of the Prior Art

Conventional internal combustion engines effect the compression of the piston rod and the orientation of the piston rod within the crank case chamber. The instant invention attempts to overcome deficiencies of the prior art by orienting the piston rod reciprocatably to vertically and reciprocatingly align the piston within a combustion chamber and direct oil flow through the piston rod for return to the crank case.

Various prior art internal combustion engines are available in the prior art of various lubrication systems as exemplified in U.S. Pat. No. 4,945,864 to Solomon, et al. setting forth a two-cycle engine and lubrication directed into the associated piston.

U.S. Pat. No. 4,864,988 to Muzger, et al. permits ease of assemblage of an oil pump housing within the engine as an integral unit therewith.

The U.S. Pat. Nos. 4,961,479; 4,830,591; and 4,809,591 are further examples of lubrication systems associated with internal combustion engines.

As such, it may be appreciated that there continues to be a need for a new and improved internal combustion engine as set forth by the instant invention which addresses both the problems of ease of use as well as effectiveness in construction to effect the cooling and lubrication of an internal combustion engine and impart tension to a piston rod during a compression stroke and in this respect, the present invention substantially fulfills this need.

SUMMARY OF THE INVENTION

In view of the foregoing disadvantages inherent in the known types of internal combustion engines now present in the prior art, the present invention provides an internal combustion engine wherein the same is directed to effect tensioning of a piston rod during a compression stroke. As such, the general purpose of the present invention, which will be described subsequently in greater detail, is to provide a new and improved internal combustion engine which has all the advantages of the prior art internal combustion engines and none of the disadvantages.

To attain this, the present invention provides an internal combustion engine arranged with an elongate piston rod, with the piston fixedly mounted substantially medially of the rod, with an upper distal end of the rod including an oil reservoir chamber piston reciprocatably mounted within the oil reservoir chamber. The piston defines a combustion chamber between the piston and a crank case member rotatably mounting a crank shaft, with the piston rod rotatably mounted to the crank shaft at a lower distal end of the piston. Oil flow is directed through an oil delivery conduit into the oil reservoir chamber and through a conduit wihtin the piston rod to enhance cooling of the piston maintaining its longevity during use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved internal combustion engine which has all the advantages of the prior art internal combustion engines and none of the disadvantages.

It is another object of the present invention to provide a new and improved internal combustion engines which may be easily and efficiently manufactured and marketed.

It is a further object of the present invention to provide a new and improved internal combustion engines which is of a durable and reliable construction.

An even further object of the present invention is to provide a new and improved internal combustion engines which is susceptible of a low cost of manufacture with regard to both materials and labor, and which accordingly is then susceptible of low prices of sale to the consuming public, thereby making such internal combustion engines economically available to the buying public.

Still yet another object of the present invention is to provide a new and improved internal combustion engine which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
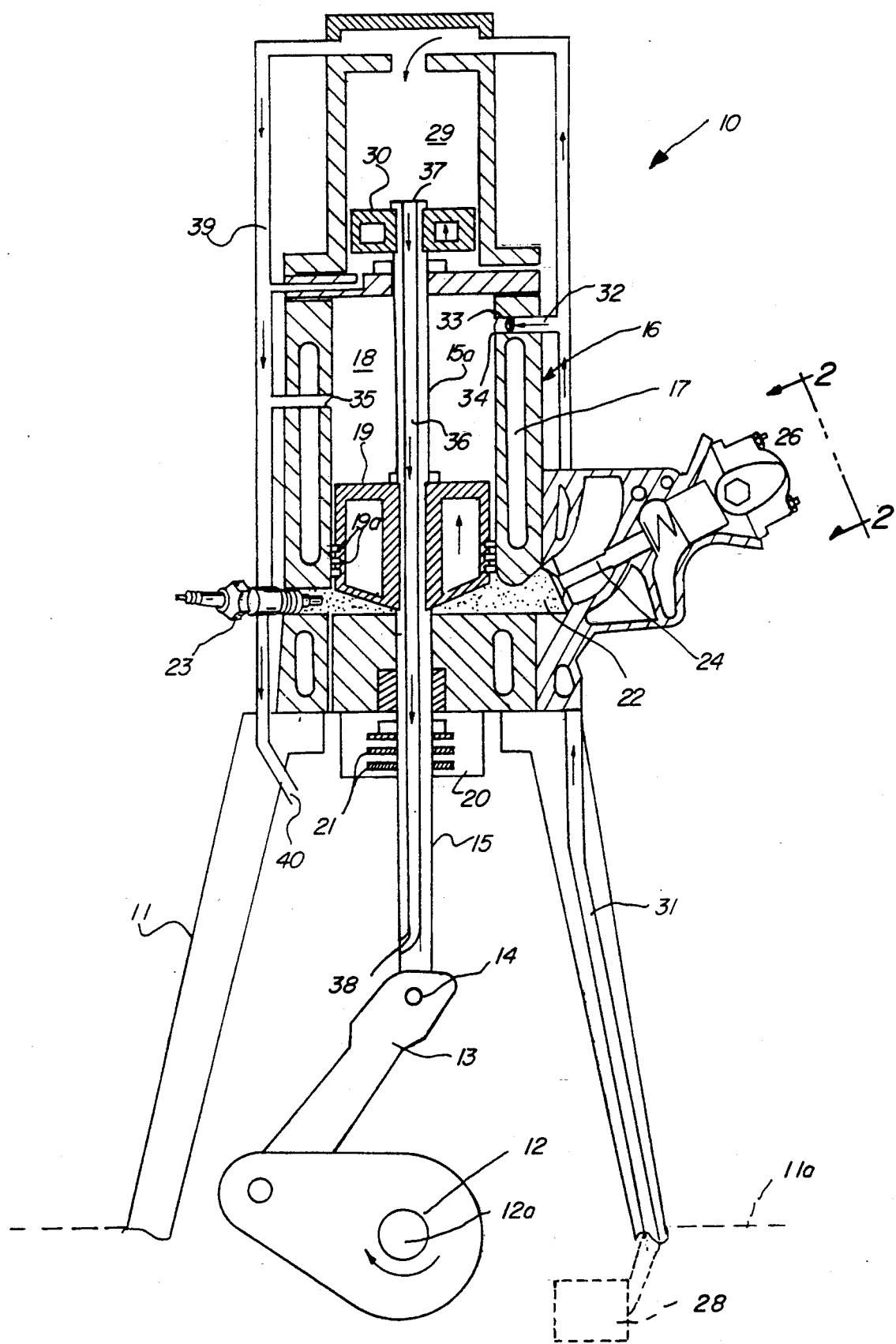
FIG. 1 is an orthographic cross-sectional illustration of the layout of the instant invention.
Figure 2:
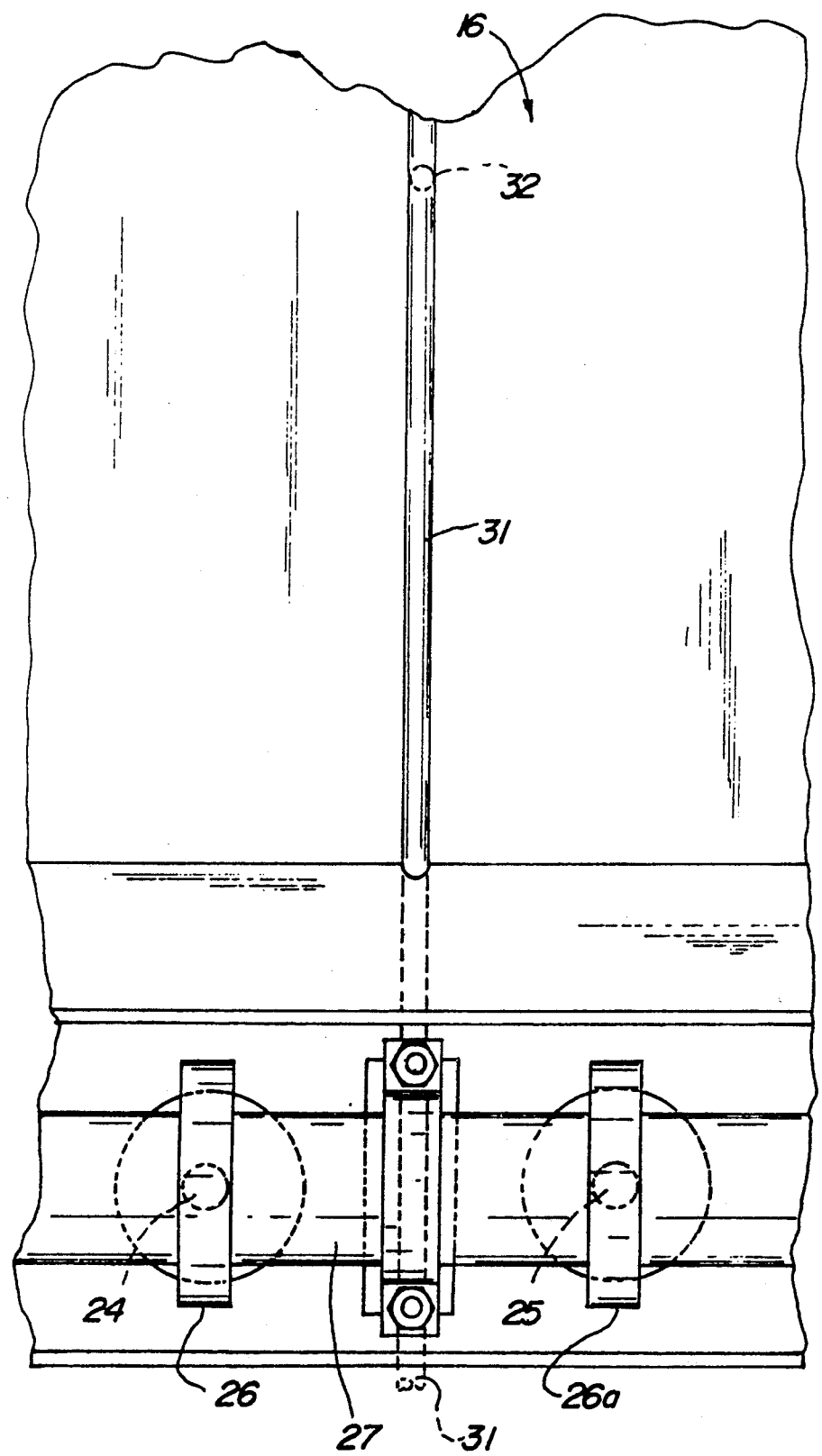
FIG. 2 is an orthographic view, taken along the lines 2—2 of FIG. 1 in the direction indicated by the arrows.

With reference now to the drawings, and in particular to FIGS. 1 and 2 thereof, a new and improved internal combustion engine embodying the principles and concepts of the present invention and generally designated by the reference numeral 10 will be described.

More specifically, the internal combustion engine 10 of the instant invention as set forth in FIG. 1 essentially comprises a crank case 11, with a crank case oil pan 11a mounted to the crank case 11 to contain lubrication oil therewithin in a conventional manner that is utilized in wet sump lubrication systems. Alternatively, a dry sump type system may be utilized as required. A crank shaft 12 is rotatably mounted within the crank case 11, with a crank shaft arm 13 including a rod journal 14 at an outer distal end of the crank shaft arm 13. A piston rod 15 has its lower distal end rotatably mounted relative to the crank shaft arm rod journal 14, with the piston rod 15 extending upwardly in radial alignment with the crank shaft center line 12a. A cylinder head 16 is fixedly mounted to an upper end of the crank case 11, with the cylinder head 16 including a cylinder head water jackets 17 as utilized to direct coolant about the associated cylindrical piston chamber 18 of the cylinder head 16. A piston 19 is reciprocatably mounted within the piston chamber 18 and fixedly mounted substantially medially of the piston rod 15, with a piston rod extension 15a extending coaxially above and beyond the piston chamber 18 into an oil reservoir chamber 29 positioned above the combustion chamber. The piston includes conventional piston rings 19a to effect sealing of the piston within the cylindrical piston chamber 18.

An alignment block 20 is fixedly mounted to a lower distal end of the cylinder head 16, with the alignment block 20 extending into the crank case 11, with the piston rod 15 reciprocatably directed therethrough. The alignment block 20 includes a plurality of alignment block sealing rings 21 in a stacked coaxial relationship to effect alignment and sealing of the piston rod in proper vertical coaxial alignment through the cylindrical piston chamber 18. The piston 19 defines a combustion chamber 22 below the piston 19 and above the crank shaft 12 within the cylinder head 16. A spark plug 23 is directed in communication with the combustion chamber 22, as well as an intake valve 24 and exhaust valve 25 cooperative through a cam shaft 27 to effect operation of a cam shaft first and second lobe 26 and 26a to effect timed sequencing of the intake and exhaust valves 24 and 25. The cam shaft 27 may be of an overhead design as illustrated, or alternatively of a type to utilize push rods and the like conventionally known in the prior art.

An oil pump 28 positioned within the crank case 11 is in fluid communication with an oil delivery conduit 31 that is directed through the crank case and subsequently through the head 16 to the oil reservoir chamber 29. Prior to its being directed within the oil reservoir chamber 29, a first oil port 32 directs oil to a top face of the piston to effect oiling of the ring structure 19a. A check valve 33 is directed within the first oil port 32 to direct oil through an orifice 34 to meter oil into the piston chamber 18. A second oil port 35 permits removal of excess oil within the piston chamber 18 to an oil return conduit 39 that includes an oil return conduit exit port 40 directed into the crank case 11 to return oil thereby. From the oil reservoir chamber 29, oil is directed through a piston rod oil conduit 36 that is directed through the piston rod from a piston rod oil conduit entrance port 37 above the oil reservoir chamber piston 30 within the oil reservoir chamber 29. The piston rod oil conduit 36 directed through the piston rods 15 and 15a empties into the crank case through a piston rod oil conduit exit port 38 positioned adjacent and spaced from a lower distal end of the piston rod 15. In this manner, coolant oil is directed through the piston rod to minimize stresses within the piston rod to effect its longevity and as illustrated and described, the piston rod is in tension during combustion stroke of the engine. It should be noted that the engine may be of a four cycle configuration or may be configured of a two cycle construction utilizing conventional two cycle layout structure of the type as set forth in U.S. Pat. No. 4,945,864 for example, incorporated herein by reference.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An internal combustion engine, comprising,
   a crank case, the crank case including a crank shaft rotatably mounted within the crank case, the crank shaft including a crank shaft arm, the arm including an arm rod journal mounted to an outer distal end of the arm spaced from the crank shaft, and
   a cylinder head, the cylinder head fixedly mounted to an upper distal end of the crank case, and
   a piston rod, the piston rod including a piston rod lower distal end rotatably mounted relative to the rod journal, and
   the piston rod including an upper distal end, and
   a cylindrical piston chamber positioned within the cylinder head, the piston rod coaxially directed through the cylindrical piston chamber, with the piston rod including a piston rod extension extending coaxially above and beyond the cylindrical piston chamber, with the piston rod upper distal end positioned exteriorly of the piston chamber, and a piston mounted fixedly to the piston rod within the cylindrical piston chamber and a combustion chamber oriented between a bottom surface of the piston and the crankcase.

2. An internal combustion engine as set forth in claim 1 including an alignment block mounted fixedly to a bottom surface of the cylinder head, with the piston rod directed slidably through the alignment block, and the alignment block including a plurality of stacked coaxially aligned sealing rings providing sliding alignment to the piston rod.

3. An internal combustion engine as set forth in claim 2 including an intake valve and exhaust valve in operative communication with the combustion chamber, and a spark plug mounted to the cylinder head in cooperation with the combustion chamber.

4. An internal combustion engine as set forth in claim 3 including an oil reservoir chamber mounted above the piston chamber, the piston rod upper distal end positioned within the oil reservoir chamber, and an oil reservoir chamber piston fixedly mounted to the piston upper distal end within the oil reservoir chamber, and an oil pump positioned within the crank case, and an oil delivery conduit in fluid communication with the oil pump directed through the crank case, including a first port directed into the combustion chamber, and the oil delivery conduit including a further port directed into the oil reservoir chamber, and an oil return conduit directed from the oil reservoir chamber, and the oil return conduit including an oil return conduit exit port directed into the crank case.

5. An internal combustion engine as set forth in claim 4 wherein the first oil port includes a check valve positioned within the first oil port, and an orifice positioned between the check valve and the piston chamber.

6. An internal combustion engine as set forth in claim 5 wherein the piston rod includes a piston rod oil conduit directed through the piston rod, with the piston rod oil conduit including an entrance port directed through the upper distal end of the piston within the oil reservoir chamber above the oil reservoir chamber piston, and the piston rod oil conduit including a piston rod oil conduit exit port in fluid communication with the piston rod oil conduit positioned adjacent to the piston rod lower distal end to direct oil to the crank case from the oil reservoir chamber.

* * * * *